United States Patent
Choi et al.

(10) Patent No.: US 12,400,171 B2
(45) Date of Patent: Aug. 26, 2025

(54) RETURNABLE PACKAGING AND FRESH PRODUCT DELIVERY SYSTEM USING PACKAGING STATE INFORMATION

(71) Applicant: THERMO LAB KOREA CO., LTD., Hwaseong-si (KR)

(72) Inventors: Seok Choi, Hwaseong-si (KR); In Yong Jang, Hwaseong-si (KR)

(73) Assignee: THERMO LAB KOREA CO., LTD., Hwaseong-si (KR)

( * ) Notice: Subject to any disclaimer, the term of this patent is extended or adjusted under 35 U.S.C. 154(b) by 90 days.

(21) Appl. No.: 18/127,683

(22) Filed: Mar. 29, 2023

(65) Prior Publication Data

US 2023/0252397 A1   Aug. 10, 2023

Related U.S. Application Data

(63) Continuation of application No. PCT/KR2021/001030, filed on Jan. 26, 2021.

(30) Foreign Application Priority Data

Oct. 12, 2020   (KR) .................. 10-2020-0131420
Nov. 20, 2020   (KR) .................. 10-2020-0156497

(Continued)

(51) Int. Cl.
G06Q 10/0832   (2023.01)
F25D 17/04   (2006.01)
G06Q 10/0833   (2023.01)

(52) U.S. Cl.
CPC ......... *G06Q 10/0832* (2013.01); *F25D 17/04* (2013.01); *G06Q 10/0833* (2013.01)

(58) Field of Classification Search
CPC . G06Q 10/0833; G06Q 10/0832; G01D 9/007
See application file for complete search history.

(56) References Cited

U.S. PATENT DOCUMENTS

2006/0213904 A1   9/2006 Kates
2007/0157653 A1   7/2007 Sasaki et al.
(Continued)

FOREIGN PATENT DOCUMENTS

JP   2005-528576 A   9/2005
JP   2005-350080 A   12/2005
(Continued)

OTHER PUBLICATIONS

Toppan, "Toppan's RFID Tag with Electronic Paper Display Drives Digital Transformation in Manufacturing" Aug. 25, 2020, https://www.holdings.toppan.com/en/news/2020/08/newsrelease200825e.html (Year: 2025).*

(Continued)

*Primary Examiner* — Jeff Zimmerman
*Assistant Examiner* — Matthew Parker Goodman
(74) *Attorney, Agent, or Firm* — Revolution IP, PLLC

(57) ABSTRACT

Disclosed is a delivery system including an order information transmission step of transmitting customer order information to a manager server, a shipping preparation step of transmitting the order information to a distribution center to prepare for shipping, a delivery preparation step of preparing packaging configured to store a product and an electronic paper display (EPD) configured to display delivery information about the packaging, a delivery-start tagging step of tagging a manager terminal including a second Bluetooth communication system and a second near-field communication system on the packaging including a first Bluetooth communication system and a first near-field communication system using near-field communication to activate the EPD, and a state information transmission step of collecting internal or external state information about the packaging during delivery of the product to transmit the collected state information to a delivery driver terminal including a third (Continued)

Bluetooth communication system and a third near-field communication system.

5 Claims, 8 Drawing Sheets

(30) Foreign Application Priority Data

Nov. 20, 2020 (KR) ........................ 10-2020-0156518
Nov. 20, 2020 (KR) ........................ 10-2020-0156530

(56) References Cited

U.S. PATENT DOCUMENTS

| | | | |
|---|---|---|---|
| 2011/0320034 A1* | 12/2011 | Dearlove | G06Q 10/083 |
| | | | 705/337 |
| 2015/0302349 A1* | 10/2015 | Atkinson | G06Q 10/0833 |
| | | | 705/333 |
| 2016/0293885 A1 | 10/2016 | Park et al. | |
| 2016/0379163 A1* | 12/2016 | Johanson | G06Q 10/0833 |
| | | | 705/333 |
| 2017/0004445 A1* | 1/2017 | Lazier | G06Q 10/0835 |
| 2019/0098432 A1* | 3/2019 | Carlson | H04W 4/70 |
| 2019/0370742 A1* | 12/2019 | Ko | G06Q 10/0835 |
| 2020/0051015 A1* | 2/2020 | Davis | G06Q 10/08 |
| 2021/0192305 A1* | 6/2021 | Saenz | G06Q 10/08 |

FOREIGN PATENT DOCUMENTS

| | | |
|---|---|---|
| JP | 2011-073689 A | 4/2011 |
| JP | 2018-039634 A | 3/2018 |
| JP | 2019-069856 A | 5/2019 |
| KR | 20-0407206 Y1 | 1/2006 |
| KR | 10-2006-0128936 A | 12/2006 |
| KR | 10-2007-0103731 A | 10/2007 |
| KR | 10-2011-0087961 A | 8/2011 |
| KR | 20-0456979 Y1 | 11/2011 |
| KR | 10-1513214 B1 | 4/2015 |
| KR | 10-2016-0001407 A | 1/2016 |
| KR | 10-2016-0032646 A | 3/2016 |
| KR | 10-2016-0119395 A | 10/2016 |
| KR | 10-1717595 B1 | 3/2017 |
| KR | 10-2018-0017151 A | 2/2018 |
| KR | 10-2088434 B1 | 3/2020 |
| KR | 10-2107549 B1 | 5/2020 |
| WO | 2018/155408 A1 | 8/2018 |
| WO | WO-2018197259 A1 * | 11/2018 |

OTHER PUBLICATIONS

The ST Blog, "Secure Bluetooth Pairing Made Easy with NFC" Oct. 22, 2019, https://blog.st.com/secure-bluetooth-pairing-made-easy-with-nfc/ (Year: 2019).*
International Search Report for PCT/KR2021/001030 mailed Jul. 9, 2021 from Korean Intellectual Property Office.

* cited by examiner

[FIG. 1]
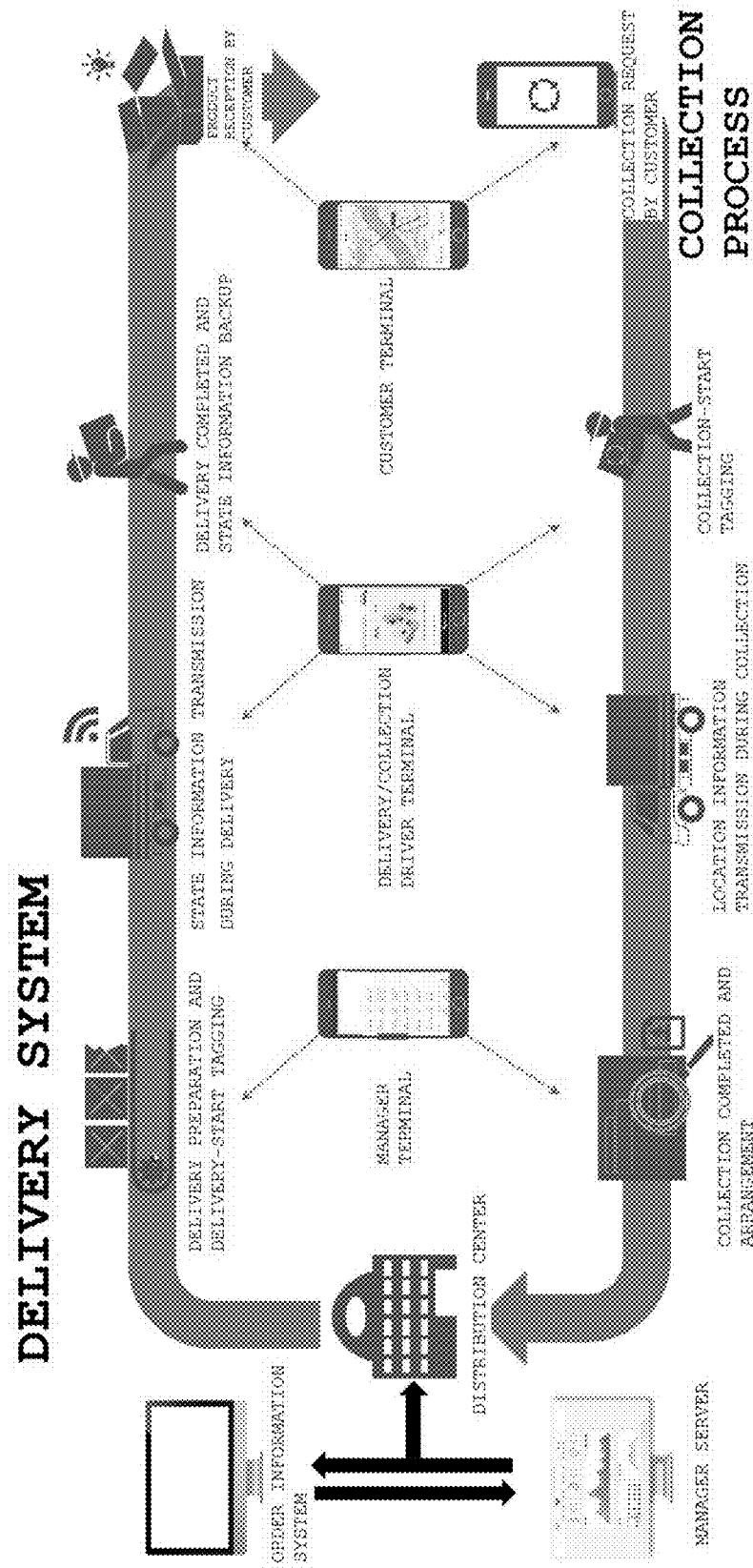

[FIG. 2]
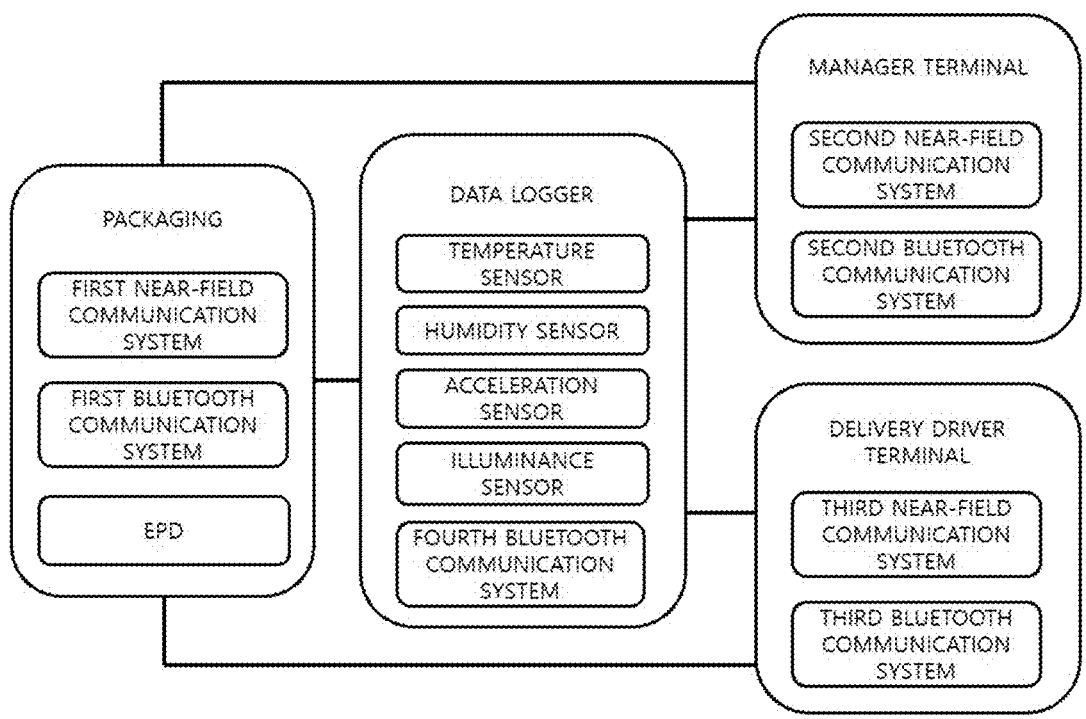

[FIG. 3]
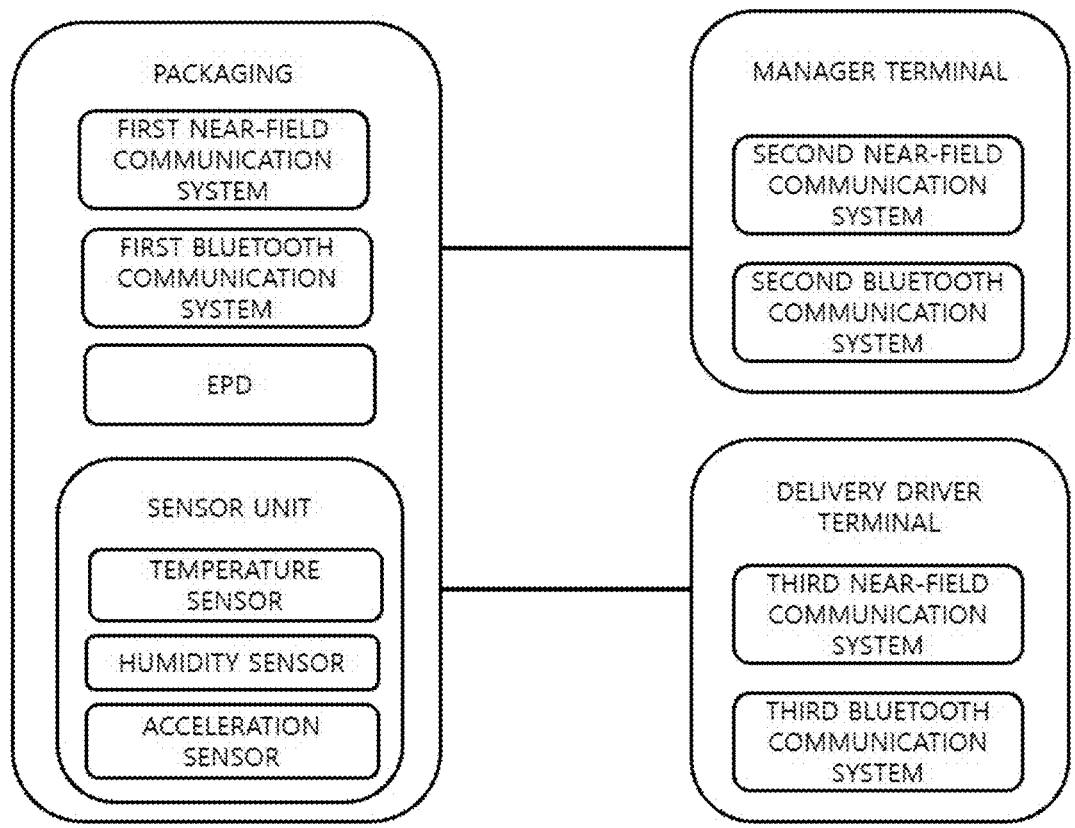

[FIG. 4]
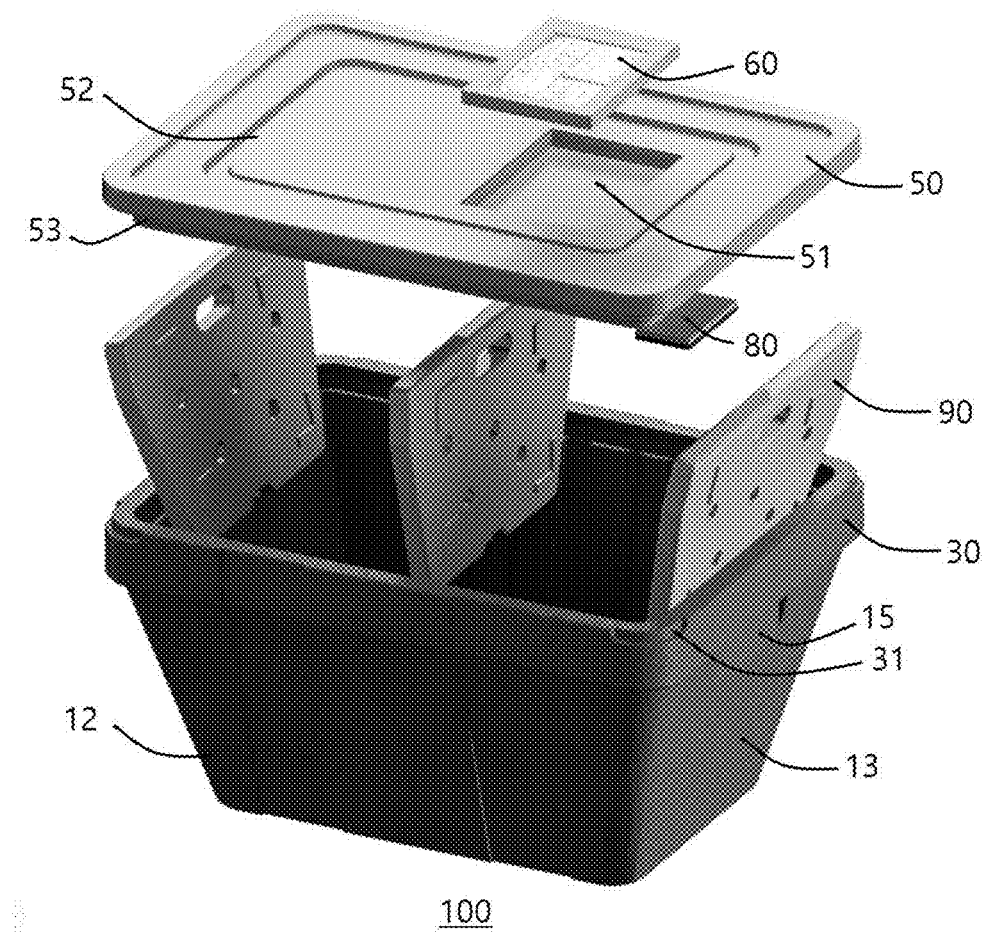

[FIG. 5]
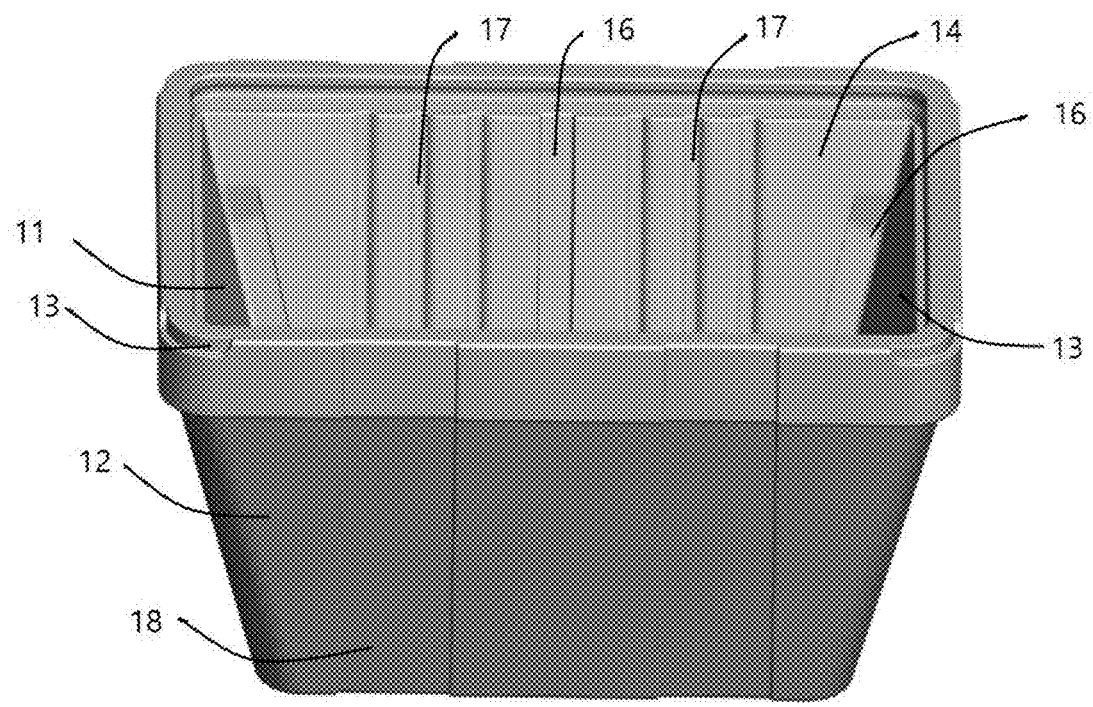

[FIG. 6]
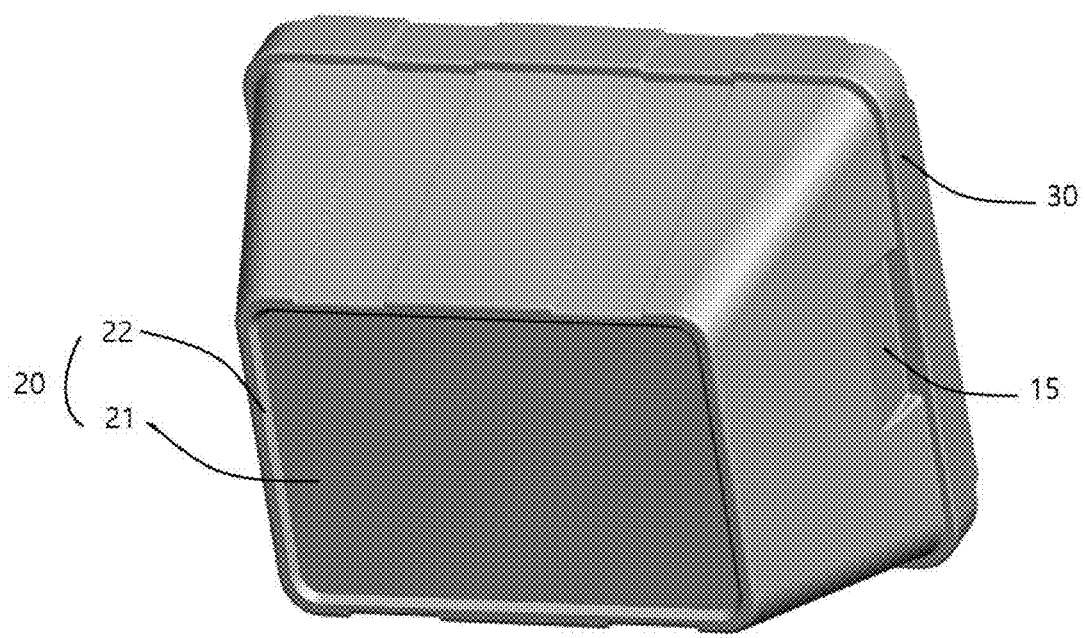

[FIG. 7]
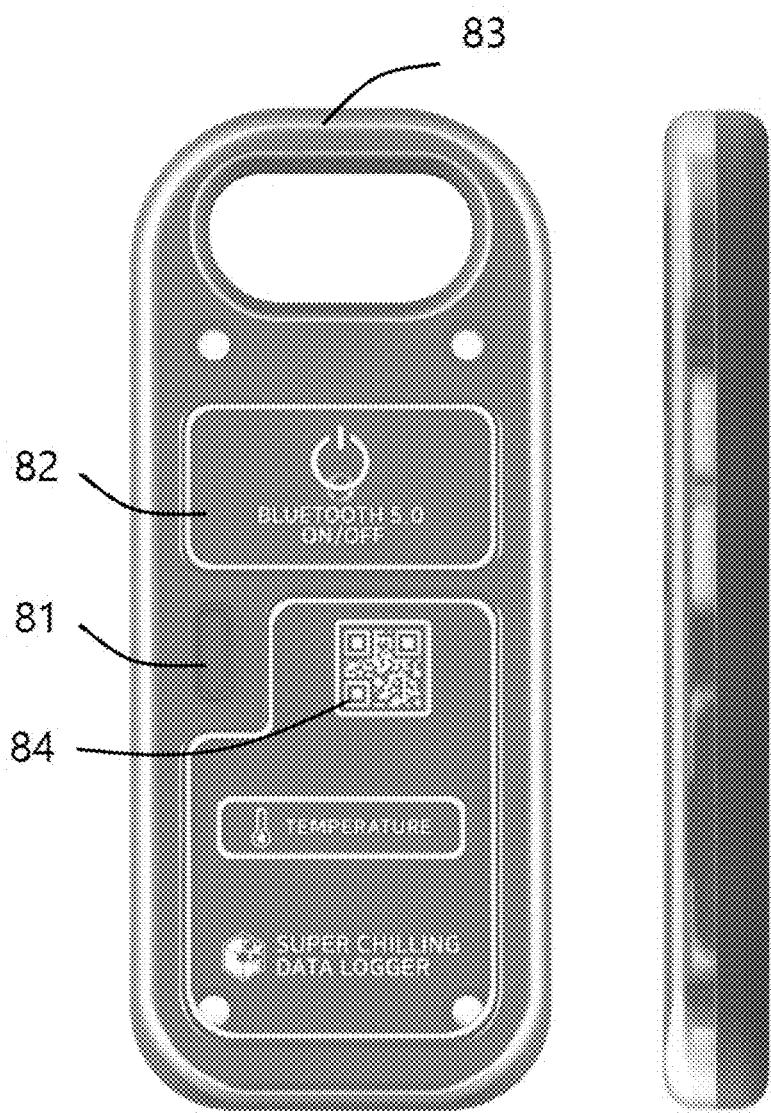

[FIG. 8]
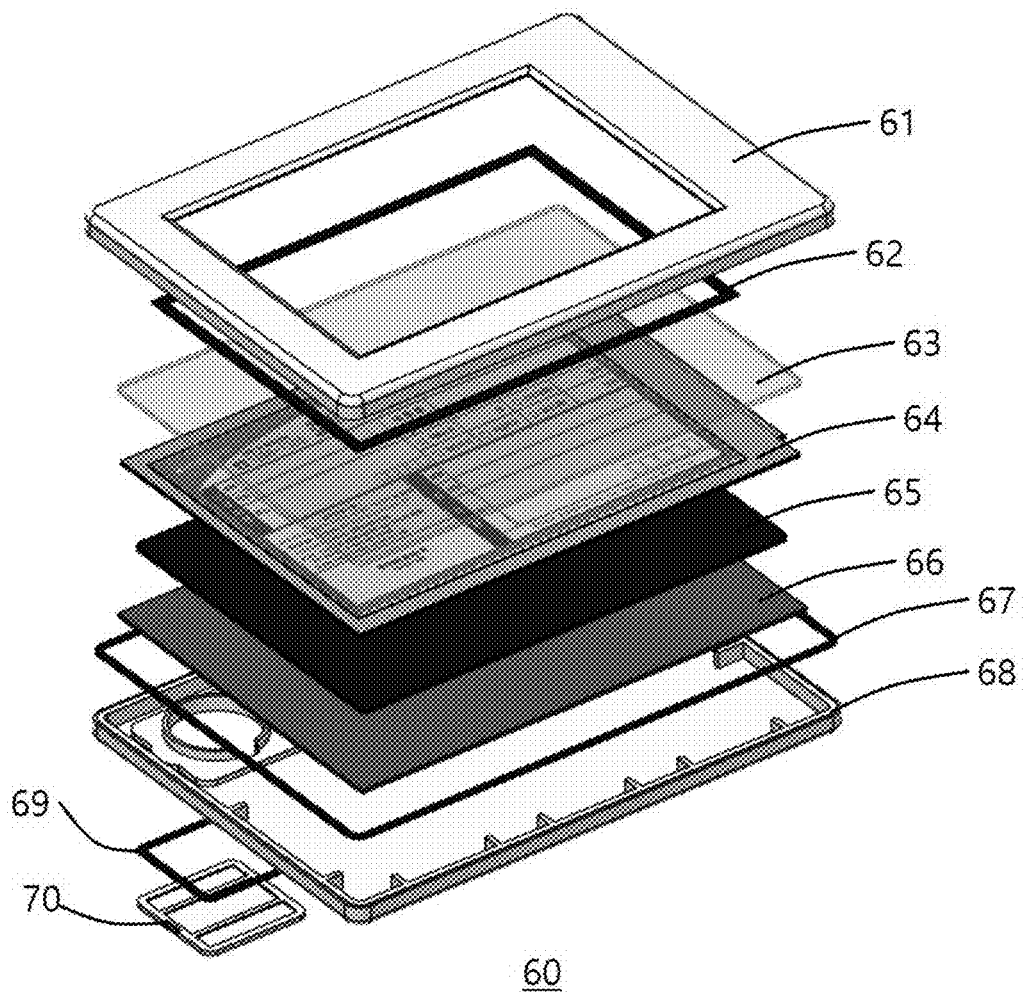

RETURNABLE PACKAGING AND FRESH PRODUCT DELIVERY SYSTEM USING PACKAGING STATE INFORMATION

TECHNICAL FIELD

The present invention relates to returnable packaging and a fresh product delivery system using packaging state information, and more particularly to returnable packaging and a fresh product delivery system using packaging state information, which includes an order information transmission step of transmitting, to a manager server, customer order information input through an order information system, a shipping preparation step of transmitting the received order information to a distribution center to prepare for shipping, a delivery preparation step of preparing packaging configured to store a product corresponding to the order information and an electronic paper display (EPD) configured to display delivery information about the packaging, a delivery-start tagging step of tagging a manager terminal including a second Bluetooth communication system and a second near-field communication system on the packaging including a first Bluetooth communication system and a first near-field communication system using near-field communication to activate the electronic paper display (EPD), and a state information transmission step of collecting internal or external state information about the packaging during delivery of the product to transmit the collected state information to a delivery driver terminal including a third Bluetooth communication system and a third near-field communication system.

BACKGROUND ART

With the recent development of the transportation industry, it has become possible to transport food that needs to be transported quickly as well as conventional cargo that has no expiration date. Because food spoils quickly when exposed to room temperature, it is necessary to store food at low temperature to keep the same fresh.

Therefore, when food is transported, a separate means for keeping the food frozen or refrigerated is required in a transportation means. However, when individually transporting a small amount of food, rather than transporting a large amount of food or frozen food, dry ice or an ice pack is placed in a box containing the food in order to prevent the food from spoiling.

In general, most packaging boxes manufactured to store or transport substances that need to be kept warm or cool, such as agricultural products, fishery products, and livestock products, are made of various materials such as paper, corrugated cardboard, and Styrofoam.

However, in a conventional delivery system, there is no way to measure or recognize damage to packaging materials or degradation in inner space insulation performance thereof during transportation. For this reason, there is a problem in that consumers and suppliers conflict over the responsibility for spoilage or defects of fresh products that occur during transportation.

As related art documents, Korean Utility Model Registration No. 20-0407206 discloses a Styrofoam box that is easy to transport, and Korean Patent Laid-Open Publication No. 10-2011-0087961 discloses a Styrofoam box having an ice pack embedded therein.

DISCLOSURE

Technical Problem

It is an object of the present invention to provide returnable packaging and a fresh product delivery system using packaging state information, which includes an order information transmission step of transmitting, to a manager server, customer order information input through an order information system, a shipping preparation step of transmitting the received order information to a distribution center to prepare for shipping, a delivery preparation step of preparing packaging configured to store a product corresponding to the order information and an electronic paper display (EPD) configured to display delivery information about the packaging, a delivery-start tagging step of tagging a manager terminal including second Bluetooth communication system and a second near-field communication system on the packaging including a first Bluetooth communication system and a first near-field communication system using near-field communication to activate the electronic paper display (EPD), and a state information transmission step of collecting internal or external state information about the packaging during delivery of the product to transmit the collected state information to a delivery driver terminal including a third Bluetooth communication system and a third near-field communication system.

Technical Solution

A delivery system according to an embodiment of the present invention includes an order information transmission step of transmitting, to a manager server, customer order information input through an order information system, a shipping preparation step of transmitting the received order information to a distribution center to prepare for shipping, a delivery preparation step of preparing packaging configured to store a product corresponding to the order information and an electronic paper display (EPD) configured to display delivery information about the packaging, a delivery-start tagging step of tagging a manager terminal including a second Bluetooth communication system and a second near-field communication system on the packaging including a first Bluetooth communication system and a first near-field communication system using near-field communication to activate the electronic paper display (EPD), and a state information transmission step of collecting internal or external state information about the packaging during delivery of the product to transmit the collected state information to a delivery driver terminal including a third Bluetooth communication system and a third near-field communication system.

In addition, the delivery system may further include a state information backup step of transmitting the state information transmitted to the delivery driver terminal to the manager server to back up the state information when delivery of the product is completed.

In addition, the delivery system may further include a collection request step of transmitting a request for collection of the packaging to the manager server when a customer terminal including a fourth near-field communication system is tagged on the packaging using a near-field communication system.

In addition, the delivery system may further include a packaging collection step of deleting delivery information displayed on the electronic paper display (EPD) and transmitting location information from a collection driver terminal cooperatively connected to a GPS to the manager server in real time when the collection driver terminal is tagged on the packaging after the collection request step.

In addition, in the delivery-start tagging step, when the manager terminal is tagged on the packaging using near-field communication, the packaging may transmit delivery information displayed on the electronic paper display (EPD) to the manager terminal using the first Bluetooth communication system.

In addition, the delivery system may include an initialization step of initializing the collected packaging and preparing the initialized packaging for next delivery after the packaging collection step.

In addition, the packaging may include a temperature sensor configured to detect temperature, a humidity sensor configured to detect humidity, and an acceleration sensor configured to detect impulse applied to the packaging. The packaging may include a main body unit 40 configured to store a product and a cover unit 50 configured to cover the main body unit 40 so as to be fixed to the main body unit 40.

Advantageous Effects

According to the present invention, there may be provided returnable packaging and a fresh product delivery system using packaging state information, which includes an order information transmission step of transmitting, to a manager server, customer order information input through an order information system, a shipping preparation step of transmitting the received order information to a distribution center to prepare for shipping, a delivery preparation step of preparing packaging configured to store a product corresponding to the order information and an electronic paper display (EPD) configured to display delivery information about the packaging, a delivery-start tagging step of tagging a manager terminal including a second Bluetooth communication system and a second near-field communication system on the packaging including a first Bluetooth communication system and a first near-field communication system using near-field communication to activate the electronic paper display (EPD), and a state information transmission step of collecting internal or external state information about the packaging during delivery of the product to transmit the collected state information to a delivery driver terminal including a third Bluetooth communication system and a third near-field communication system.

DESCRIPTION OF DRAWINGS

FIG. 1 is a diagram showing an overall flow of a delivery system according to the present invention.

FIG. 2 is a diagram showing some components of a delivery system according to an embodiment of the present invention.

FIG. 3 is a diagram showing some components of a delivery to another embodiment of the present invention.

FIGS. 4 to 6 are views showing packaging of the delivery system according to an embodiment of the present invention.

FIG. 7 is a view showing a data logger according to an embodiment of the present invention.

FIG. 8 is a view showing an electronic paper display (EPD) according to an embodiment of the present invention.

BEST MODE

Hereinafter, embodiments of the present invention will be described in detail with reference to the accompanying drawings so that those skilled in the art to which the present invention pertains may easily carry out the embodiments. The present invention may, however, be embodied in many different forms, and should not be construed as being limited to the embodiments set forth herein.

It is to be noted that the drawings are illustrated as being schematic and are not illustrated in actual sizes. The relative dimensions and ratios of parts in the drawing may be illustrated as being enlarged or reduced in the sizes of the parts for clarity and convenience in the drawings, and specific dimensions are only illustrative, but not limitative. Furthermore, the same structure, element, or part shown in two or more drawings is assigned the same reference numeral in order to indicate a similar characteristic.

An embodiment of the present invention illustrates an ideal embodiment of the present invention in detail. As a result, it is expected that the illustration may be modified in various ways. Accordingly, the embodiment is not limited to a specific form of a shown area, and it may include a modification of a form according to fabrication, for example.

In the drawings, the respective reference numerals have the following meanings. 10: sidewall portion, 11: first sidewall, 12: second sidewall, 13: third sidewall, 14: fourth sidewall, 15: handle portion, 16: slot, 17: cool air circulation passage, 18: air passage, 20: bottom portion, 21: planar bottom portion, 22: peripheral protruding portion, 30: coupling portion, 31: cover unit opening/closing slot, 32: seating portion, 40: main body unit, 50: cover unit, 51: receiving portion, 52: shaking prevention portion, 53: inner protruding portion, 60: electronic paper display panel, 61: upper case, 62: first foam, 63: tempered glass member, 64: display panel, 65: second foam, 66: PCB, 67: third foam, 68: lower case, 69: fourth foam, 70: battery cover, 80: data logger, 81: display unit, 82: power button, 83: grip portion, 84: device tag, 90: refrigerant pack, 100: packaging.

FIG. 1 is a diagram showing an overall flow of a delivery system according to the present invention, FIG. 2 is a diagram showing some components of a delivery system according to an embodiment of the present invention, and FIG. 3 is a diagram showing some components of a delivery system according to another embodiment of the present invention.

A delivery system according to an embodiment of the present invention includes an order information transmission step of transmitting, to a manager server, customer order information input through an order information system and a shipping preparation step of transmitting the received order information to a distribution center to prepare for shipping.

The delivery system according to the present invention includes a delivery preparation step of preparing packaging that stores a product corresponding to the order information and an electronic paper display for displaying delivery information about the packaging.

In a delivery-start tagging step, a manager terminal including a second Bluetooth communication system and a second near-field communication system is tagged on the packaging including a first Bluetooth communication system and a first near-field communication system using near-field communication, and the delivery information about the packaging and data in a data logger are matched through the above tagging process and are transmitted to the manager server. Due to the above process, the manager terminal and a delivery driver terminal are capable of performing near-field communication with the packaging.

In addition, in the delivery-start tagging step, when the manager terminal is tagged on the packaging using near-field communication, the electronic paper display (EPD) is activated, and the packaging transmits the delivery information displayed on the electronic paper display (EPD) to the manager terminal using the first Bluetooth communication system.

Near-field communication (NFC) is wireless communication technology that can transmit and receive data without contact between devices within a short distance range, e.g. about 10 cm, and can perform bidirectional transmission and reception of data, unlike conventional wireless communication technology.

Near-field communication (NFC) requires the following three components: an NFC chipset configured to transmit and receive data and to process the same, an antenna configured to assist in transmission of frequencies for NFC, and a USIM configured to store user information. The NFC chipset enables bidirectional transmission and reception of data between devices as needed.

After delivery of the product starts through the above process, a state information transmission step is performed such that internal or external state information about the packaging is collected during delivery and the collected state information is transmitted to the delivery driver terminal including a third Bluetooth communication system and a third near-field communication system.

A configuration for state information transmission is classified into the following two embodiments: a first embodiment (FIG. 2) related to a configuration for collecting and transmitting internal state information about the packaging and a second embodiment (FIG. 3) related to a configuration for collecting and transmitting external state information about the packaging.

Firstly, the first embodiment of collecting and transmitting internal state information about the packaging will be described.

In the first embodiment, as shown in FIG. 2, a data logger that can be inserted into the packaging is separately provided, and a temperature sensor, a humidity sensor, an acceleration sensor, and an illuminance sensor are disposed in the data logger. In addition, a fourth Bluetooth communication system capable of transmitting the internal state information collected by the data logger is disposed in the data logger.

In the first embodiment, the state information preferably includes temperature, humidity, illuminance, and impulse. Temperature and humidity are detected in order to continuously manage the surrounding environment so that the fresh product that is delivered is prevented from spoiling, and illuminance is detected in order to sense unintended opening of the packaging during delivery or to sense opening of the packaging by a customer when delivery is completed. When it is determined, based on illuminance, that delivery has been completed, transmission of the state information is terminated, and the state information stored during delivery is backed up. Impulse is detected by the acceleration sensor, which will be described later. In the event of damage to the product, the amount of impulse applied to the product during delivery is detected, whereby it is possible to analyze the cause of damage and to solve the problem.

Bluetooth uses a total of 79 channels in the range of 2402 to 2480 MHZ, which is the industrial scientific and medical (ISM) frequency band allocated for industrial, scientific, and medical use. The ISM band is a band commonly used around the world, and therefore there is no need to acquire permission to use the band. However, because there is a concern that signal interference occurs between systems, Bluetooth uses frequency hopping. Frequency hopping is a technique where a device quickly switches among a large number of channels according to a specific pattern, transmitting small amounts of data. Bluetooth hops at a rate of 1, 600 times per second over 79 allocated channels, thereby minimizing signal interference.

Connecting Bluetooth-enabled devices to each other is called "pairing." After a master device and a slave device that support a Bluetooth function are prepared, Bluetooth is activated to connect the two devices to each other.

Secondly, the second embodiment related to configuration for collecting and transmitting external state information about the packaging will be described.

In the second embodiment, a separate data logger for collecting state information is not included, because external state information about the packaging, rather than internal state information about the packaging, is collected. Instead thereof, a sensor unit capable of collecting state information is provided in an EPD module provided on the outer side of the packaging. The sensor unit includes a temperature sensor for detecting temperature, a humidity sensor for detecting humidity, and an acceleration sensor for detecting impulse applied to the packaging. Unlike the first embodiment, the reason why an illuminance sensor is not included is that there is no need to sense opening of a cover unit of the packaging, because the sensor unit is exposed to the outside of the packaging to collect state information about the surroundings of the packaging.

The state information about external the surroundings of the packaging preferably includes temperature detected by the temperature sensor, humidity detected by the humidity sensor, and impulse detected by the acceleration sensor. Temperature and humidity are detected in order to continuously manage the surrounding environment so that the fresh product that is delivered is prevented from spoiling, and impulse is detected by the acceleration sensor, which will be described later. In the event of damage to the product, the amount of impulse applied to the product during delivery is detected, whereby it is possible to analyze the cause of damage and to solve the problem.

The temperature sensor, the humidity sensor, and the acceleration sensor constitute the sensor unit, as shown in FIG. 3. Preferably, the sensor unit is integrally formed with the electronic paper display (EPD), and includes a temperature sensor configured to detect external temperature around the packaging, a humidity sensor configured to detect external humidity around the packaging, and an acceleration sensor configured to detect impulse applied to the packaging. Preferably, the temperature sensor, the humidity sensor, and the acceleration sensor are attached to a module of the electronic paper display (EPD). Preferably, the sensors are formed on a PCB of the electronic paper display (EPD).

Alternatively, it may be possible to individually attach the temperature sensor, the humidity sensor, and the acceleration sensor to the module of the electronic paper display (EPD) in order to collect state information without the sensor unit, which is a separate physical device, rather than forming the separate sensor unit in which the temperature sensor, the humidity sensor, and the acceleration sensor are mounted. Due to such a structure, the separate physical sensor unit in which the sensors are mounted is eliminated, and therefore the packaging has an efficient configuration.

When delivery of the product is completed, a state information backup step is performed such that the state information transmitted to the delivery driver terminal is transmitted to the manager server and is backed up. Using the backed-up state information, it is possible to check change in the state of the product that occurred during delivery and thus to demonstrate that the product has been delivered normally or to find problems.

When delivery is completed and the customer who received the product tags the customer terminal including a fourth near-field communication system on the packaging using the near-field communication system in order to request collection of the packaging, a collection request step is performed such that a request for collection of the packaging is transmitted to the manager server. The packaging according to the present invention is a returnable item that is designed to be reusable, thereby significantly reducing a logistical cost.

When a collection driver tags a collection driver terminal on the packaging in response to the collection request, a packaging collection step is performed such that the delivery information displayed on the electronic paper display (EPD) is deleted and location information is collection transmitted from the driver terminal cooperatively connected to a GPS to the manager server in real time. The collection driver and/or the collection driver terminal may be the same as or different from the delivery driver and/or the delivery driver terminal in consideration of the driver's route in order to ensure efficient work.

After collection of the packaging is completed, an initialization step is performed such that the collected packaging is initialized in order to be reused and the initialized packaging is prepared for next delivery.

The manager terminal may substitute for a conventional paper invoice, and may enable integration of distributed tasks related to product shipping. The manager terminal may enable integration and management of several cases through near-field communication (NFC).

When the manager terminal is tagged on the electronic paper display (EPD) included in the packaging, information is registered on the electronic paper display (EPD). After delivery of the product and collection of the packaging are completed, it is possible to check whether the packaging is collected and the managed state of the packaging and to solve problems.

The delivery driver terminal informs the delivery driver of locations to which the delivery driver needs to deliver items and the number of items. When the delivery driver terminal is tagged on the packaging, information about the packaging is transmitted to the delivery driver terminal. When there is a customer request for collection of the packaging, the collection driver terminal may check information about collection of the packaging and whether collection is completed.

The customer terminal provides the delivery location and state of the product ordered by the customer through the GPS. The customer terminal provides the customer with the freshness of the ordered product and state information about the same (temperature, humidity, etc.) during delivery, thereby enabling the customer to monitor delivery of the product. The customer terminal enables the customer to request collection of the packaging after taking the ordered product out of the packaging.

FIGS. 4 to 6 are views showing packaging of the delivery system according to an embodiment of the present invention.

FIG. 7 is a view showing a data logger according to an embodiment of the present invention.

FIG. 8 is a view showing an electronic paper display (EPD) according to an embodiment of the present invention.

As shown in FIGS. 4 to 6, packaging may include a main body unit capable of storing a product and a cover unit capable of covering the main body unit so as to be fixed thereto. The main body unit includes a sidewall portion, which includes a first sidewall, a second sidewall, a third sidewall, and a fourth sidewall, a bottom portion, which is connected to the lower end of the sidewall portion to form a bottom, and a coupling portion, which is formed on the upper end of the sidewall portion. The cover unit is coupled to the coupling portion to cover the upper surface of the main body unit, and includes a receiving portion formed in the upper surface thereof.

The bottom portion includes a planar bottom portion, which is located in the middle thereof, and a peripheral protruding portion, which is formed around the planar bottom portion so as to protrude downwards. Each of the first sidewall and the third sidewall includes a handle portion concavely formed in the upper end portion thereof at a position contiguous to the coupling portion so as to be gripped by a hand. All of the first sidewall, the second sidewall, the third sidewall, and the fourth sidewall extend from the bottom portion so as to be slanted such that portions thereof contiguous to the coupling portion are larger than portions thereof contiguous to the bottom portion. Each of the second sidewall and the fourth sidewall has a cool air circulation passage formed in the middle of the inner surface thereof, through which cool air from a refrigerant pack circulates, and an air passage formed in the outer surface thereof, through which air flows so that two or more packaging boxes can be easily separated from each other in the state of being stacked one above another.

It is preferable for the packaging to be formed such that the cross-sectional area thereof gradually increases in the upward direction away from the bottom portion, whereby the coupling portion, to which the cover unit is coupled, is larger than the bottom portion. The reason for this structure is to reduce a logistical cost when storing the packaging collected after completion of use thereof. Because a conventional packaging box has a rectangular parallelepiped shape, it is necessary to place one packaging box on another packaging box in order to store multiple packaging boxes in a warehouse. In this case, however, the volume occupied by the packaging boxes stacked one above another is very large, and therefore the number of packaging boxes that can be stored is restricted. In contrast, in the case of the packaging according to the present invention, when the packaging box is collected after completion of use thereof, the refrigerant pack is stored in the main body unit, and multiple packaging boxes are stacked one above another in an overlapping manner, whereby the volume occupied by the stacked packaging boxes is greatly reduced.

However, in the case in which the packaging boxes are stacked in an overlapping manner, it may be difficult to separate the packaging boxes from each other because the upper packaging box is tightly fitted into the lower packaging box. Therefore, in order to solve this problem, it is preferable that the second sidewall and the fourth sidewall have air passages formed in the outer surfaces thereof to allow air to flow therethrough so that two or more packaging boxes can be easily separated from each other in the state of being stacked one above another. That is, since air is introduced into the air passages formed in the outer surfaces of the second sidewall and the fourth sidewall, it is possible to prevent formation of a vacuum between the stacked packaging boxes, thus facilitating separation of the packaging boxes from each other.

Each of the second sidewall and the fourth sidewall has slots formed in both side ends of the inner surface thereof so as to be symmetrical with each other so that refrigerant packs are inserted into the slots. Each of the second sidewall and the fourth sidewall has cool air circulation passages formed in the middle of the inner surface thereof to allow cool air from the refrigerant packs to circulate therethrough. Preferably, the slots into which the refrigerant packs are inserted are formed in both side ends of the packaging. The refrigerant packs inserted into both side ends of the packaging supply cool air to the inner space in the main body unit. When two spaces having different storage temperatures are required in the packaging, it is preferable to form a slot in the middle of the inner surface of each of the second sidewall and the fourth sidewall in order to divide the inner space in the packaging into two spaces so that different kinds of items are respectively stored in the two spaces.

The main body unit is preferably made of expanded polypropylene (EPP) or expanded polystyrene (EPS).

Expanded polypropylene is a high-tech material used for automobile parts, packing materials, building materials, insulation materials, and the like, and is suitable for increasing stability in packing of products and reducing the volume of packaging due to excellent cracking resistance, flexibility, and chemical resistance. Expanded polystyrene is formed in such a manner that polystyrene, to which a foaming agent has been applied, is subjected to extrusion to form a low-foam raw sheet and then both sides of the raw sheet are heated in the air in order to increase the degree of foaming. Since expanded polystyrene is formed through sole foaming, the same has high insulation properties and low density, thus exhibiting further superior toughness. Due to these characteristics, expanded polystyrene is widely used for insulation containers (fish packing boxes or the like), shock-absorbing packaging for fragile devices, food plates, and the like.

The data logger included in the first embodiment preferably includes a temperature sensor for detecting temperature in the packaging, a humidity sensor for detecting humidity in the packaging, an illuminance sensor for detecting opening of the cover unit of the packaging, and an acceleration sensor for detecting impulse applied to the packaging. As shown in FIG. 10, the data logger preferably includes a grip portion formed in such a manner that the upper end portion of the data logger is open so as to be gripped by a hand, a power button configured to turn on/off operating power, and at least two light-emitting diodes (LEDs) configured to emit ultraviolet rays of different wavelengths.

Since the data logger receives power in a wireless manner from, for example, a battery, it is necessary to save power. That is, when the acceleration sensor detects the amount of impulse applied to the data logger, the data logger is activated, whereby the sensors are activated in the state in which power is being supplied to the data logger.

The data logger preferably includes a microcontroller unit (MCU), which has a dedicated gateway and is configured to drive the data logger and to control operation of the data logger, a display unit configured to display the state of the data logger, and a power unit configured to supply operating power to the data logger. The data logger may start operating when a power switch is pressed using the power supply unit or when the degree of impulse detected by the acceleration sensor mounted in the sensor unit exceeds a predetermined level.

The operating mode of the data logger may include a sleep mode, a standby mode, a start mode, and a delivery mode. When the power button is pressed or touched lightly in the sleep mode, the data logger enters the start mode, and records delivery information. Upon receiving a delivery-start instruction after recording the delivery information, the data logger collects and receives data corresponding to environmental information (temperature, humidity, illuminance, and impulse) as a delivery state, and displays a warning signal and outputs a warning sound upon detecting abnormality in temperature or impulse. When delivery is completed, the data logger transmits the collected data to a cloud server, and enters the sleep mode upon receiving a termination instruction.

The microcontroller unit (MCU), which is a processor for controlling the system, serves to control various functions of the data logger. The display unit includes at least two light-emitting diodes (LEDs) configured to emit ultraviolet rays of different wavelengths. For example, in the case in which light-emitting diodes (LEDs) configured to emit red light and green light are provided, when a battery (a wireless power supply) is loaded, the green LED blinks for about 10 seconds, and then is turned off in order to reduce current consumption. Thereafter, when connected to the delivery driver terminal, the green LED is turned on for 10 seconds, and then is turned off in order to reduce current consumption. In addition, when the temperature or the humidity detected by the sensors is out of a predetermined range of temperature or humidity or when opening of the cover unit of the packaging is detected by the illuminance sensor, the red LED may be turned on.

The electronic paper display may include, from above to below, an upper case, a first foam disposed between the upper case and a display panel, a tempered glass member, the display panel, a second foam disposed between the display panel and a PCB, the PCB, a third foam disposed between the upper case and a lower case, the lower case, a fourth foam disposed between the lower case and a battery cover, and the battery cover.

The reason why the electronic paper display is included in the present invention is to replace a conventional paper invoice. A paper invoice has problems in that the same is frequently damaged during delivery and is particularly vulnerable to moisture, making it impossible to check the content thereon upon becoming wet. In order to prevent these problems, the electronic paper display panel is used in place of a paper invoice, and the present invention has the above configuration in order to prevent the electronic paper display panel from being damaged during delivery. The first to fourth foams are provided in order to prevent the risk of separation of the components from each other or damage to the components due to impact. It is preferable for the electronic paper display to have four foams between the components.

While the present invention has been particularly shown and described with reference to exemplary embodiments thereof, it will be apparent to those skilled in the art that various changes in form and details may be made without departing from the essential characteristics of the embodiments set forth herein.

The above embodiments are therefore to be construed in all aspects as illustrative and not restrictive, and it is to be understood that the invention is not limited to the disclosed embodiments, but, on the contrary, is intended to cover various modifications and equivalent arrangements included within the spirit and scope of the appended claims, and equivalents thereof.

The invention claimed is:

1. A delivery system comprising:
   an order information system configured to receive order information which is input by a customer terminal;
   a manager server configured to receive the order information from the order information system and to transmit the received order information to a distribution center to prepare for shipping;

a packaging configured to store a product corresponding to the order information and including a first near-field communication system and a first Bluetooth communication system for communicating with other devices located nearby;

a manager terminal configured to be operated by a manager and including a second near-field communication system and a second Bluetooth communication system for communicating with other devices located nearby, and a delivery driver terminal configured to be operation by a delivery driver and including a third near-field communication system and a third Bluetooth communication system for communicating with other devices located nearby, wherein the packaging further includes:

a main body unit formed to have a container shape, the main body unit including a sidewall portion formed by a plurality of sidewalls, a bottom portion coupled to a lower end of the sidewall portion to close a lower portion of the main body, and a coupling portion formed on an upper end of the sidewall portion;

a cover unit coupled to the coupling portion to cover an upper portion of the main body unit;

an electronic paper display (EPD) mounted into a receptacle formed at the cover unit and configured to display delivery information about the packaging;

a sensor unit installed at the packaging to be exposed to an outside of the packaging, the sensor unit being configured to measure properties of outer environment of the packaging which include a temperature, a humidity, and an impulse of the outside of the packaging and to convert the measured properties into external state information; and a data logger formed portable and separate from the packaging so as to be inserted into and removable from an inside of the packaging, the data logger being configured to measure properties of inner environment of the packaging which include a temperature, a humidity, and an impulse of the inside of the packaging and to convert the measured properties into internal state information, wherein before starting a delivery, when the manager terminal is tagged on the packaging, the packaging transmits the delivery information displayed on the EPD to the manager terminal, and the delivery information and data in the data logger are matched and transmitted to the manager server by the manager terminal, such that the manager terminal and the delivery driver terminal are capable of communicating with the packaging including the data logger and the sensor unit, and wherein the data logger and the sensor unit collect the internal and external state information about the packaging during the delivery of the product and transmit the collected state information to the delivery driver terminal such that the delivery driver continuously monitors status of the inside and the outside of the packaging and manages the packaging to avoid damages to the product.

2. The delivery system according to claim 1,
wherein the delivery driver terminal transmits the state information to the manager server to back up the state information, when the delivery of the product is completed.

3. The delivery system according to claim 2,
wherein the customer terminal transmits a request for collection of the packaging to the manager server when the customer terminal is tagged on the packaging after the delivery of the product.

4. The delivery system according to claim 3,
wherein a collection driver terminal deletes the delivery information displayed on the (EPD) and transmits location information using a global positioning system (GPS) to the manager server in real time when the collection driver terminal is tagged on the packaging.

5. The delivery system according to claim 4, wherein the collected packaging is initialized and prepared for a next delivery after the collection of the packaging is completed.

* * * * *